(12) United States Patent
Edson et al.

(10) Patent No.: US 7,426,977 B2
(45) Date of Patent: Sep. 23, 2008

(54) VEHICLE POWER STEERING SYSTEM

(75) Inventors: Joey D. Edson, Seymour, MO (US); Klaus G. Engel, Waterloo (CA); Randy C. Foster, Strafford, MO (US); Richard J. Meckstroth, Vonore, TN (US)

(73) Assignee: Fluid Routing Solutions, Inc., Rochester Hills, MI (US)

( * ) Notice: Subject to any disclaimer, the term of this patent is extended or adjusted under 35 U.S.C. 154(b) by 196 days.

(21) Appl. No.: 11/268,467

(22) Filed: Nov. 7, 2005

(65) Prior Publication Data

US 2007/0102227 A1 May 10, 2007

(51) Int. Cl.
*B62D 5/06* (2006.01)
(52) U.S. Cl. .................. 180/441; 180/417; 180/421
(58) Field of Classification Search .............. 180/417, 180/421, 441, 422, 432, 442
See application file for complete search history.

(56) References Cited

U.S. PATENT DOCUMENTS

| | | | |
|---|---|---|---|
| 4,409,789 A | 10/1983 | Hansen et al. | |
| 4,557,342 A * | 12/1985 | Drutchas | 180/442 |
| 4,651,841 A * | 3/1987 | Adams | 180/422 |
| 4,715,464 A * | 12/1987 | Nakamura et al. | 180/441 |
| 4,790,401 A * | 12/1988 | Sonoda | 180/422 |
| 4,875,540 A | 10/1989 | Oshita et al. | |
| 5,553,683 A | 9/1996 | Wenzel et al. | |
| 5,713,429 A * | 2/1998 | Doolittle | 180/423 |
| 6,170,599 B1 * | 1/2001 | Kikuti et al. | 180/421 |
| 6,250,416 B1 | 6/2001 | Pluschke et al. | |
| 6,276,487 B1 * | 8/2001 | Bieber et al. | 180/426 |
| 6,298,941 B1 | 10/2001 | Spadafora | |
| 6,539,710 B2 | 4/2003 | Draper | |
| 2002/0079156 A1 * | 6/2002 | Nazars | 180/442 |
| 2004/0089497 A1 * | 5/2004 | Kang | 180/421 |

* cited by examiner

*Primary Examiner*—Lesley D. Morris
*Assistant Examiner*—Maurice Williams
(74) *Attorney, Agent, or Firm*—Joseph V. Tassone; Thompson Hine LLP

(57) ABSTRACT

A first vehicle power steering system includes a twistable steering torsion bar, a magnet, a Hall sensor, and a valve. The steering torsion bar has a first end fixedly connected to a vehicle steering wheel. The magnet is movable in a first and an opposite second longitudinal direction with respect to the steering torsion bar and is constrained to move in the first longitudinal direction when the steering wheel is turned to the right by a driver and is constrained to move in the second longitudinal direction when the steering wheel is turned to the left by the driver. The Hall sensor has an output and is positioned proximate the magnet. The valve is operatively connected to the output. A second vehicle power steering system includes a twistable steering torsion bar, a ring-magnet support cylinder, a ring-magnet assembly, a ball-and-ramp assembly, a spring, a Hall sensor, and a valve.

20 Claims, 16 Drawing Sheets

US 7,426,977 B2

VEHICLE POWER STEERING SYSTEM

TECHNICAL FIELD

The present invention relates generally to vehicles, and more particularly to a vehicle power steering system.

BACKGROUND OF THE INVENTION

Conventional vehicle power steering systems, such as ones used in automobiles and light trucks, use a continuously operating hydraulic pump and a twistable steering torsion bar connected at one end to a vehicle steering wheel and connected at the other end to the pinion gear of the steering system. A driver turning the vehicle steering wheel results in twisting of the steering torsion bar which physically opens and closes hydraulic flow-control valves which results in high pressure fluid flowing to one side or the other side of a hydraulic piston which moves the wheel tie rods to turn the vehicle wheels. Unsuccessful attempts at designing an electric-controlled hydraulic system, which involved the steering torsion bar in the valve control loop to produce a pressure level, are known.

Still, scientists and engineers continue to seek improved vehicle power steering systems.

SUMMARY OF THE INVENTION

A first expression of an embodiment of the invention is for a vehicle power steering system which includes a twistable steering torsion bar, a magnet, at least one Hall sensor, and at least one hydraulic-power-steering-system valve. The steering torsion bar has a longitudinal axis and has a first end fixedly connected to a vehicle steering wheel. The magnet is movable in a first and an opposite second longitudinal direction with respect to the steering torsion bar and is constrained to move in the first longitudinal direction when the steering wheel is turned to the right by a driver and is constrained to move in the second longitudinal direction when the steering wheel is turned to the left by the driver. The at-least-one Hall sensor has an output and is positioned proximate the magnet wherein the magnet moves in the first longitudinal direction with respect to the at-least-one Hall sensor when the steering wheel is turned to the right by the driver and moves in the second longitudinal direction with respect to the at-least-one Hall sensor when the steering wheel is turned to the left by the driver. The at-least-one hydraulic-power-steering-system valve is operatively connected to the output.

A second expression of an embodiment of the invention is identical to the first expression of the previous paragraph with the added limitation that the steering torsion bar has a second end fixedly connected to a pinion shaft of a rack and pinion steering gear mechanism.

A third expression of an embodiment of the invention is for a vehicle power steering system which includes a twistable steering torsion bar, a ring-magnet support cylinder, a ring-magnet assembly, a ball-and-ramp assembly, a spring, at least one Hall sensor, and at least one hydraulic-power-steering-system valve. The steering torsion bar has a longitudinal axis, a first end, and a second end, wherein the first end is fixedly connected to a vehicle steering wheel. The ring-magnet support cylinder is substantially coaxially aligned with the longitudinal axis and is fixedly connected to one of the first and second ends of the steering torsion bar. The ring-magnet assembly includes a ring magnet, circumferentially surrounds the ring-magnet support cylinder, and is movable in a first and an opposite second longitudinal direction with respect to the ring-magnet support cylinder. The ball-and-ramp assembly includes a plurality of balls and an annular ramp subassembly. The ramp subassembly is substantially coaxially aligned with the longitudinal axis, is fixedly connected to the other of the first and second ends of the steering torsion bar, and includes a corresponding plurality of ball ramps disposed proximate the ring magnet assembly. Each ball ramp is adapted to move a contacting ball in the first longitudinal direction when the steering wheel is turned to the right by a driver and to move a contacting ball in the second longitudinal direction when the steering wheel is turned to the left by a driver. The spring longitudinally biases the ring-magnet assembly to contact the plurality of balls and the plurality of balls to contact the corresponding ball ramps. The at-least-one Hall sensor has an output and is positioned proximate the ring magnet wherein the ring magnet moves in the first longitudinal direction with respect to the at-least-one Hall sensor when the steering wheel is turned to the right by the driver and moves in the second longitudinal direction with respect to the at-least-one Hall sensor when the steering wheel is turned to the left by the driver. The at-least-one hydraulic-power-steering-system valve is operatively connected to the output.

Several benefits and advantages are derived from one or more of the expressions of an embodiment of the invention. In one example, having at least one Hall sensor to sense steering wheel torque enables the at-least-one hydraulic-power-steering system valve to be electrically actuated and enables the power steering system to operate on demand which saves on fuel consumption, as can be appreciated by those skilled in the art. In the same or a different example, having valve control based on the output of a Hall sensor which depends on steering wheel torque and which is adjusted for measured fluid pressure, allows feedback control that converges on a desired pressure avoiding high frequency cycling events felt in the steering wheel of unsuccessful electric-controlled power steering systems which include a driver-to-vehicle feedback loop, as can be appreciated by the artisan. In the same or a different example, having the at-least-one Hall sensor be actuated by a magnet which moves longitudinally in response to steering torsion bar twist avoids the use of contact electric rings and contact brushes.

DESCRIPTION OF THE PREFERRED EMBODIMENTS

Figure 1:
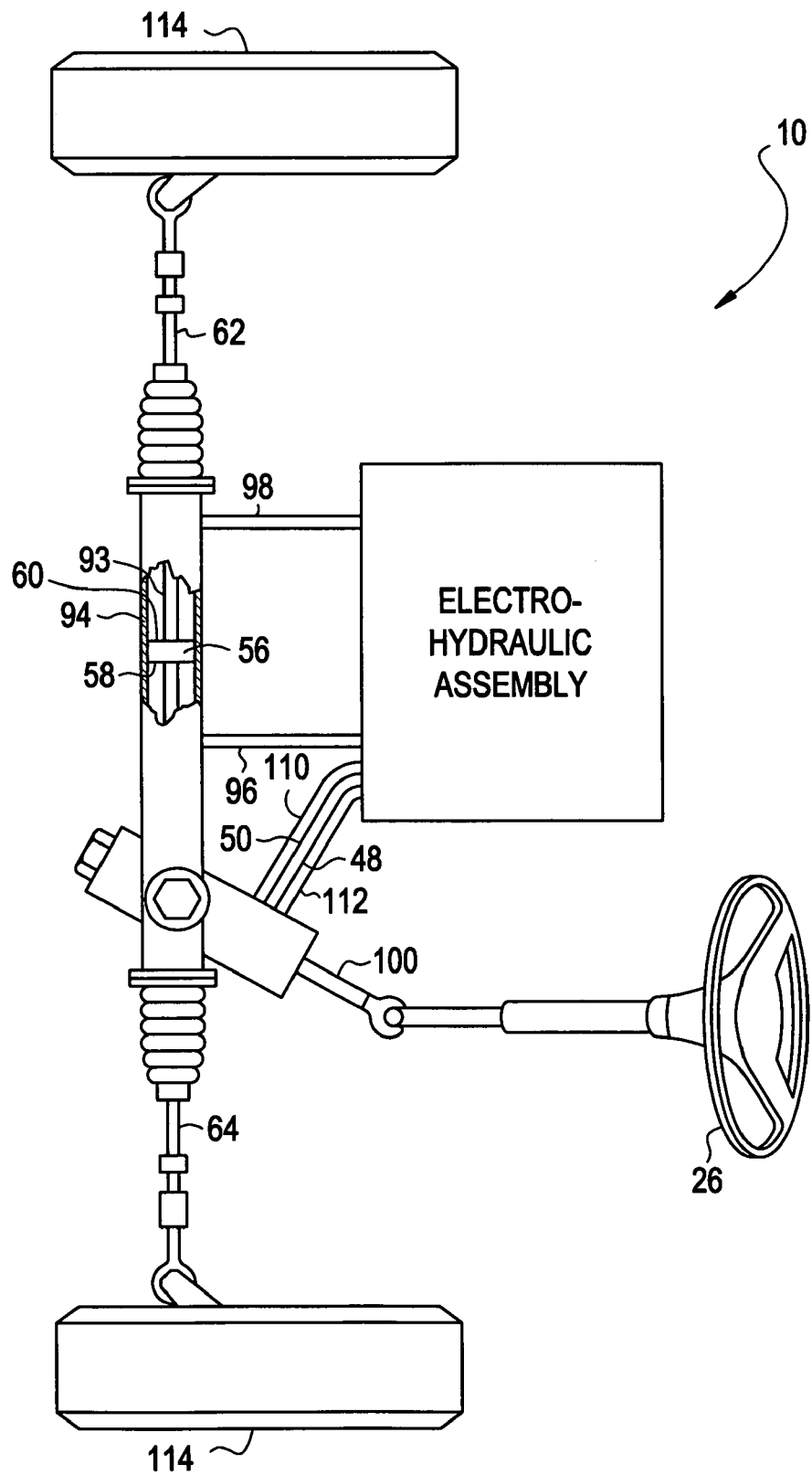
FIG. 1 is a schematic diagram of a first embodiment of a vehicle power steering system of the invention.

Referring now to the drawings, FIGS. 1-5 illustrate a first embodiment of the present invention. A first expression of the embodiment of FIGS. 1-5 is for a vehicle power steering system 10 including a sweep magnet 12, at least one Hall sensor 14 and 16, and at least one hydraulic-power-steering-system valve 18 and 20. The sweep magnet 12 is fixedly connected to a first end 22 of a twistable steering torsion bar 24 wherein the first end 22 is fixedly connected to a vehicle steering wheel 26. The at least one Hall sensor 14 and 16 is fixedly connected to a second end 28 of the steering torsion bar 24. The at-least-one Hall sensor 14 and 16 has an output 30 and 32 and is disposed proximate the sweep magnet 12 such that the output 30 and 32 is a function of steering wheel torque when the vehicle steering wheel 26 is turned by a driver. The at least one hydraulic-power-steering-system valve 18 and 20 is operatively connected to the output 30 and 32.

The term "connected" includes directly connected and indirectly connected. Describing the sweep magnet 12 as fixedly connected to a first end 22 of a twistable steering torsion bar 24 means the sweep magnet 12 is fixedly connected directly or indirectly to the first end 22 without such connection path having to pass through the second end 28 of the steering torsion bar 24. Likewise, describing the at-least-one Hall sensor 14 and 16 as fixedly connected to a second end 28 of the steering torsion bar 24 means the at-least-one Hall sensor 14 and 16 is fixedly connected directly or indirectly to the second end 28 without such connection path having to pass through the first end 22 of the steering torsion bar 24. The terminology "Hall sensor" means Hall effect sensor as is known in the sensor art.

In one enablement of the first expression of the embodiment of FIGS. 1-5, the at-least-one Hall sensor 14 and 16 includes first and second Hall sensors 14 and 16. In one variation, the output 30 and 32 includes a first output 30 of the first Hall sensor 14 and a second output 32 of the second Hall sensor 16. In one modification, the at-least-one hydraulic-power-steering-system valve 18 and 20 is operatively connected to at least one of the first and second outputs 30 and 32 through a controller 34. Having two Hall sensors instead of a single Hall sensor overcomes any deadband problems that may be present in certain applications, as can be appreciated by the artisan.

In one implementation of the first expression of the embodiment of FIGS. 1-5, the at least-one hydraulic-power-steering-system valve 18 and 20 includes an electrically actuated first valve 18 and an electrically actuated second valve 20. In one variation, the first valve 18 is operatively connected to the first and second outputs 30 and 32 and the second valve 20 is operatively connected to the first and second outputs 30 and 32. In the same or a different implementation, the at-least-one hydraulic-power-steering-system valve 18 and 20 is a pressure control valve. In the same or a different implementation, the vehicle power steering system 10 includes first and second biasing magnets 36 and 38 fixedly connected, respectively, to the first and second Hall sensors 14 and 16 to create a baseline magnetic field.

A second expression of the embodiment of FIGS. 1-5 is for a vehicle power steering system 10 including: a first cylinder 40; a second cylinder 42; hydraulic-power-steering-system, electrically-actuated, first and second pressure-control valves 44 and 46; and a controller 34. The first cylinder 40 has a sweep magnet 12 and is fixedly connected to a first end 22 of a twistable steering torsion bar 24 wherein the first end 22 is fixedly connected to a vehicle steering wheel 26. The second cylinder 42 has circumferentially spaced apart first and second Hall sensors 14 and 16 and is fixedly connected to a second end 28 of the steering torsion bar 24. The second cylinder 42 is substantially coaxially aligned with the first cylinder 40. The first and second Hall sensors 14 and 16 have corresponding first and second voltage outputs 48 and 50 and are disposed proximate the sweep magnet 12 such that the first and second voltage outputs 48 and 50 are functions of steering wheel torque when the vehicle steering wheel 26 is turned by a driver. The controller 34 calculates a voltage difference between the first voltage output 48 and the second voltage output 50, outputs a first control voltage 52 to the first pressure-control valve 44 if the voltage difference is positive, and outputs a second control voltage 54 to the second pressure-control valve 46 if the voltage difference is negative.

In one example, the voltage (or a pressure) difference is equal to the first voltage (or pressure) output minus the second voltage (or pressure) output. In a different example, the voltage (or a pressure) difference is equal to the second voltage (or pressure) output minus the first voltage (or pressure) output.

In one implementation of the second expression of the embodiment of FIGS. 1-5, the vehicle power steering system 10 also includes a hydraulic piston 56 having a right-turn side 58 and a left-turn side 60 and operatively connected to right and left wheel tie rods 62 and 64. The first pressure control valve 44 is operatively connected to the right-turn side 58 of the hydraulic piston 56 and the second pressure-control valve 46 is operatively connected to the left-turn side 60 of the hydraulic piston 56. In one variation, the vehicle power steering system 10 also includes a first pressure transducer 66 having a first pressure output 68 and operatively connected to the right-turn side 62 of the hydraulic piston 56 and a second pressure transducer 70 having a second pressure output 72 and operatively connected to the left-turn side 60 of the hydraulic piston 56.

In one application of the second expression of the embodiment of FIGS. 1-5, the controller 34 calculates a pressure difference between the first pressure output 68 and the second pressure output 72. In one variation, the controller 34 adjusts the voltage difference in a predetermined manner based on a comparison of the pressure difference to the voltage difference. In one example, a predetermined scale factor is used, wherein the voltage difference is adjusted to equal the predetermined scale factor times the pressure difference, and wherein the predetermined scale factor is experimentally determined, as is within the level of skill of the artisan. In one modification, the controller calculates the first and second control voltages based on the adjusted voltage difference. In one example, the first and second control voltages each are time-tuned, filtered, and proportional to the absolute value of the adjusted voltage difference, such time-tuning, filtering, and proportionality being experimentally determined, as is within the level of skill of the artisan.

In one arrangement of the second expression of the embodiment of FIGS. 1-5, the second cylinder 42 includes first and second biasing magnets 37 and 38 (shown in FIGS. 3-4) disposed, respectively, under the first and second Hall sensors 14 and 16 to create a baseline magnetic field.

Referring again to the drawings, FIGS. 6-10 illustrate a second embodiment of the present invention. An expression of the embodiment of FIGS. 6-10 is for a vehicle power steering system 110 including: a first cylinder 140; a second cylinder 142; a hydraulic-power-steering-system, electrically-actuated pressure-control valve 178; and a controller 134. The first cylinder 140 has a sweep magnet 112 and is fixedly connected to a first end 122 of a twistable steering torsion bar 124 wherein the first end 122 is fixedly connected to a vehicle steering wheel 126. The second cylinder 142 has circumferentially spaced apart first and second Hall sensors 114 and 116 and is fixedly connected to a second end 128 of the steering torsion bar 124. The second cylinder 142 is substantially coaxially aligned with the first cylinder 140. The first and second Hall sensors 114 and 116 have corresponding first and second voltage outputs 148 and 150 and are disposed proximate the sweep magnet 112 such that the first and second voltage outputs 148 and 150 are functions of steering wheel torque when the vehicle steering wheel 126 is turned by a driver. The controller calculates a voltage difference between the first voltage output 148 and the second voltage output 150 and outputs a control voltage 180 to the pressure-control valve 178 based on the voltage difference.

In one implementation of the expression of the embodiment of FIGS. 6-10, the vehicle power steering system 110 also includes a hydraulic piston 156 having a right-turn side 158 and a left-turn side 160 and operatively connected to right and left wheel tie rods 162 and 164, and the vehicle power steering system 110 also includes right and left electric valves 182 and 184. The right electric valve 182 is disposed between and in fluid communication with the pressure control valve 178 and the right-turn side 158 of the hydraulic piston 156, and the left electric valve 184 is disposed between and in fluid communication with the pressure control valve 178 and the left-turn side 160 of the hydraulic piston 156. The controller 134 opens the right or left electric valve 182 or 184 depending on the sign of the voltage difference. In one variation, the vehicle power steering system 110 also includes a first pressure transducer 166 having a first pressure output 168 and operatively connected to the right-turn side 162 of the hydraulic piston 156 and a second pressure transducer 170 having a second pressure output 172 and operatively connected to the left-turn side 160 of the hydraulic piston 156.

In one application of the expression of the embodiment of FIGS. 6-10, the controller 134 calculates a pressure difference between the first pressure output 168 and the second pressure output 172. In one variation, the controller 134 adjusts the voltage difference in a predetermined manner based on a comparison of the pressure difference to the voltage difference. In one example, a predetermined scale factor is used, wherein the voltage difference is adjusted to equal the predetermined scale factor times the pressure difference, and wherein the predetermined scale factor is experimentally determined, as is within the level of skill of the artisan. In one modification, the controller calculates the first and second control voltages based on the adjusted voltage difference. In one example, the first and second control voltages each are time-tuned, filtered, and proportional to the absolute value of the adjusted voltage difference, such time-tuning, filtering, and proportionality being experimentally determined, as is within the level of skill of the artisan.

In one arrangement of the expression of the embodiment of FIGS. 6-10, the second cylinder 142 includes first and second biasing magnets 136 and 138 (shown in FIGS. 8-9) disposed, respectively, under the first and second Hall sensors 114 and 116 to create a baseline magnetic field.

Figure 2:
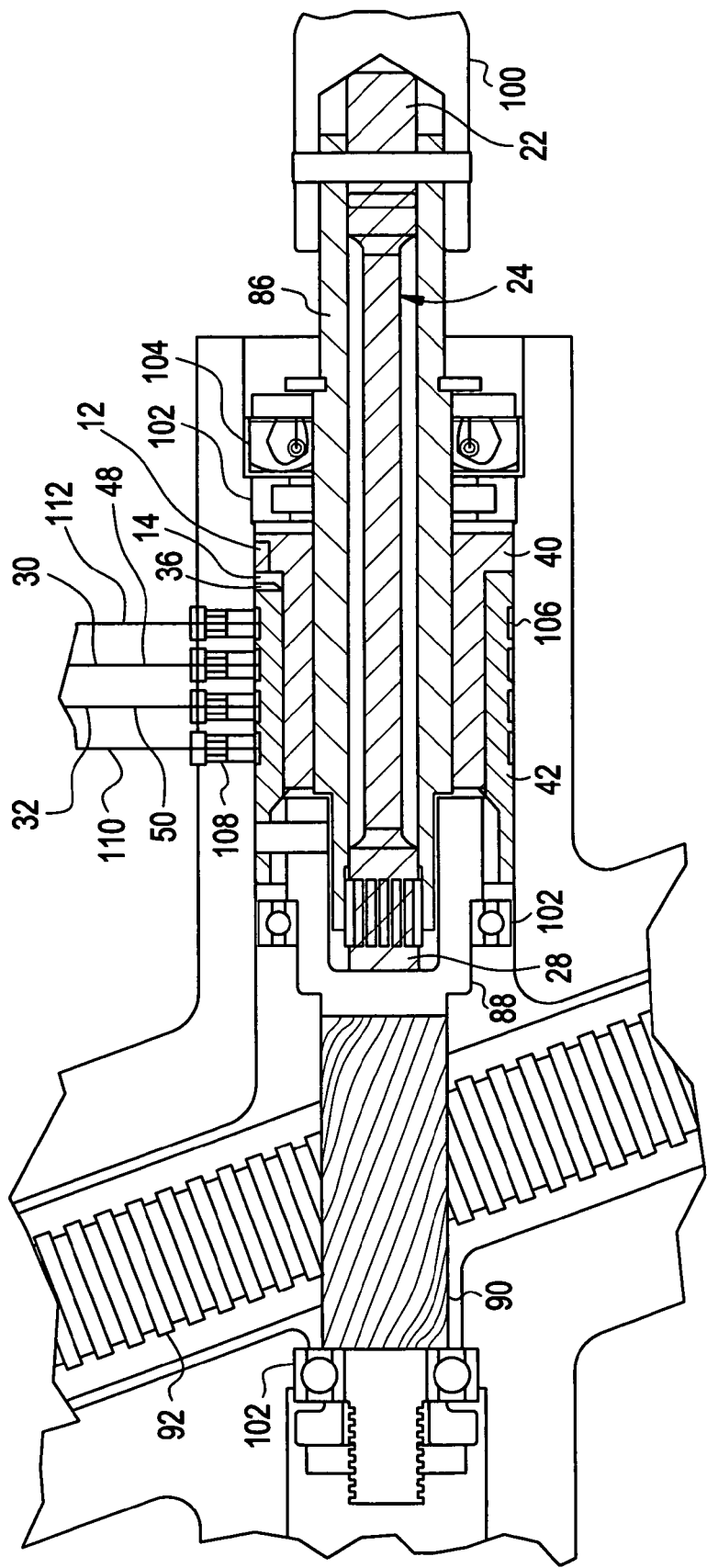
FIG. 2 is a cutaway view of a portion of the power steering system of FIG. 1 including the steering torsion bar.

The following paragraphs (including references to figures) present a detailed description of one enablement of the second expression of the embodiment of FIGS. 1-5. As shown in FIGS. 1-2, the first cylinder 40 is attached to the steering wheel tube 86 which is attached to the first end 22 of the steering torsion bar 24. The second cylinder 42 is attached to the pinion shaft 88 which is attached to the second end 28 of the steering torsion bar 24. The pinion shaft 88 is attached to the pinion gear 90 which engages the rack gear 92. The rack shaft 93 of the rack gear 92 moves the right and left wheel tie rods 62 and 64 and is connected to the hydraulic piston 56 inside the hydraulic cylinder 94 to which is operatively attached the right-turn hydraulic line 96 on the right-turn side 58 of the hydraulic piston 56 and the left-turn hydraulic line 98 on the left-turn side 60 of the hydraulic piston 56. It is noted that the steering wheel shaft 100 is attached at one end to the vehicle steering wheel 26 and at the other end to both the first end 22 of the steering torsion bar 24 and the steering wheel tube 86. Bearings 102 and seals 104 are also shown. Four contact electric rings 106 on the second cylinder 42 and four non-rotatable contact brushes 108 provide electrical communication over four lines (positive voltage 110, ground 112, first voltage output 48 and second voltage output 50) between the controller 34 and the first and second Hall sensors 14 and 16.

The pinion gear 90 typically makes four to six revolutions as the hydraulic piston 56 moves from one end of the hydraulic cylinder 94. The sweep magnet 12 sweeps past these two Hall sensors 14 and 16 with a motion proportional to steering wheel torque. This sweep magnet is approximately 0.5 mm away from the Hall sensors in the axial direction. Since the second cylinder 42 must rotate up to six times in its full travel, spring loaded electrical contact brushes 108 are in contact with the contact electric rings 106 at all points in its travel. The relative motion of second cylinder 42 to the first cylinder 40 is proportional to the steering wheel torque because the first end of the steering torsion bar 24 is rigidly attached to the steering wheel tube 86 and the second end 28 is rigidly attached to the pinion gear 90. The steering wheel tube 86 is rigidly attached the steering wheel shaft 100. When the steering wheel torque occurs, as the vehicle steering wheel 26 is turned to steer the wheels 114, the steering torsion bar 24 twists-proportionally to the amount of torque. Thus we have relative rotational motion between the second and first cylinders 42 and 40 proportional to the steering wheel torque.

Figure 13:
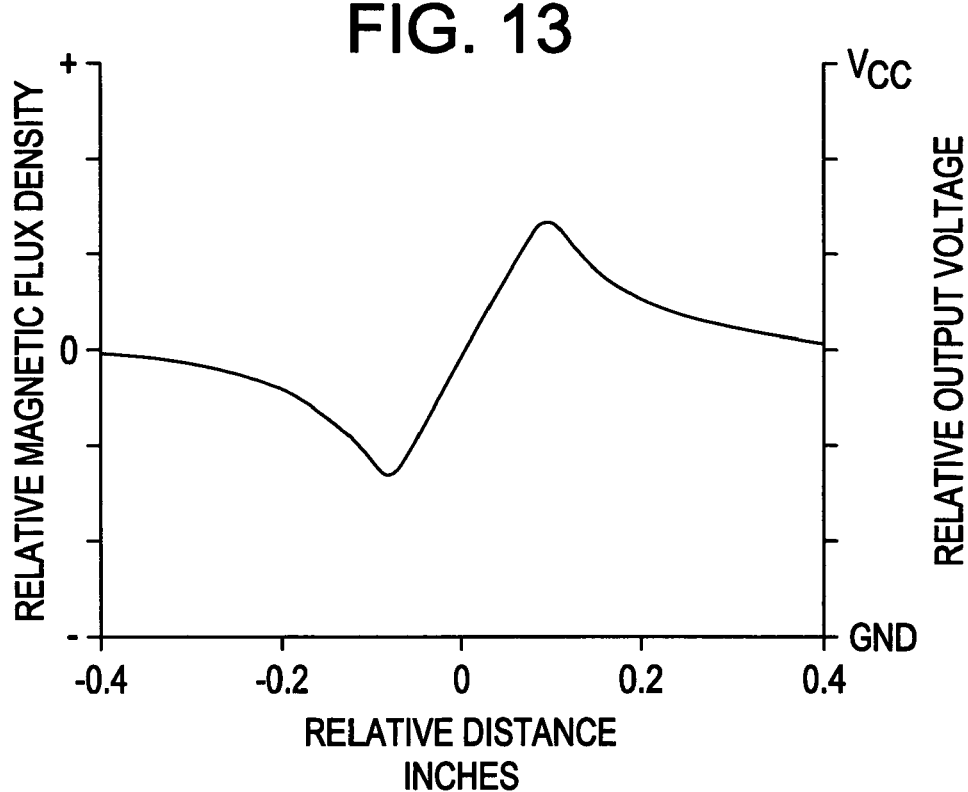
FIG. 13 is a graph plotting the relative magnetic flux density at (and the relative voltage output of) a Hall sensor versus the relative midpoint separation distance in inches between the Hall sensor and the sweep magnet.
Figure 14:
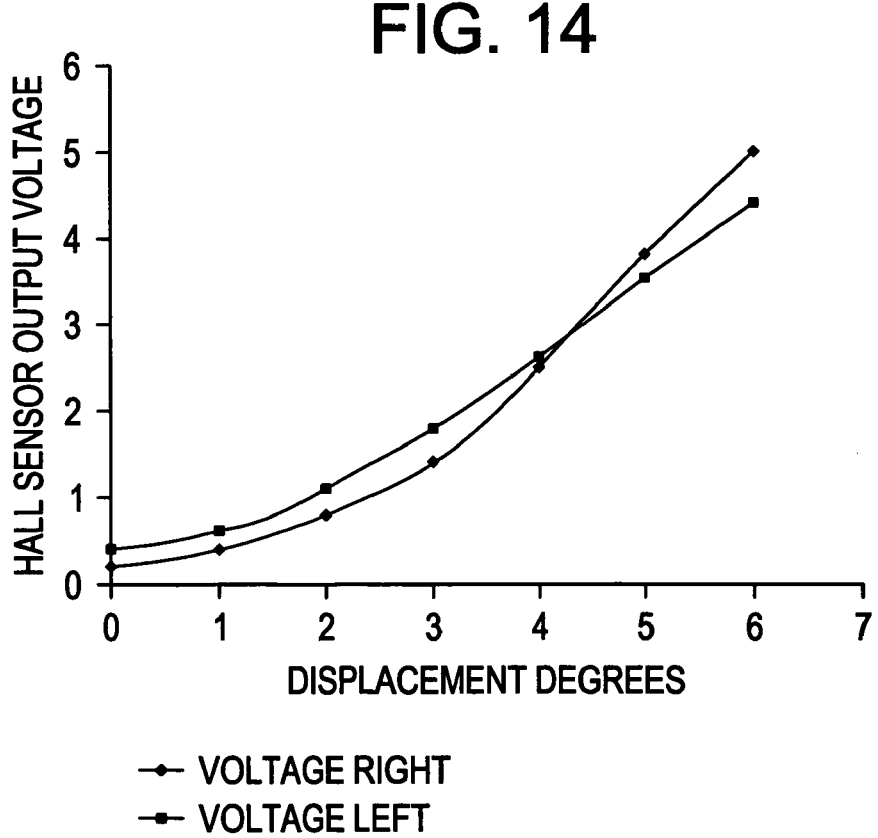
FIG. 14 is a graph plotting the first and second voltage outputs of the first and second Hall sensors versus the sensor-to-sweep-magnet displacement in degrees.
Figure 15:
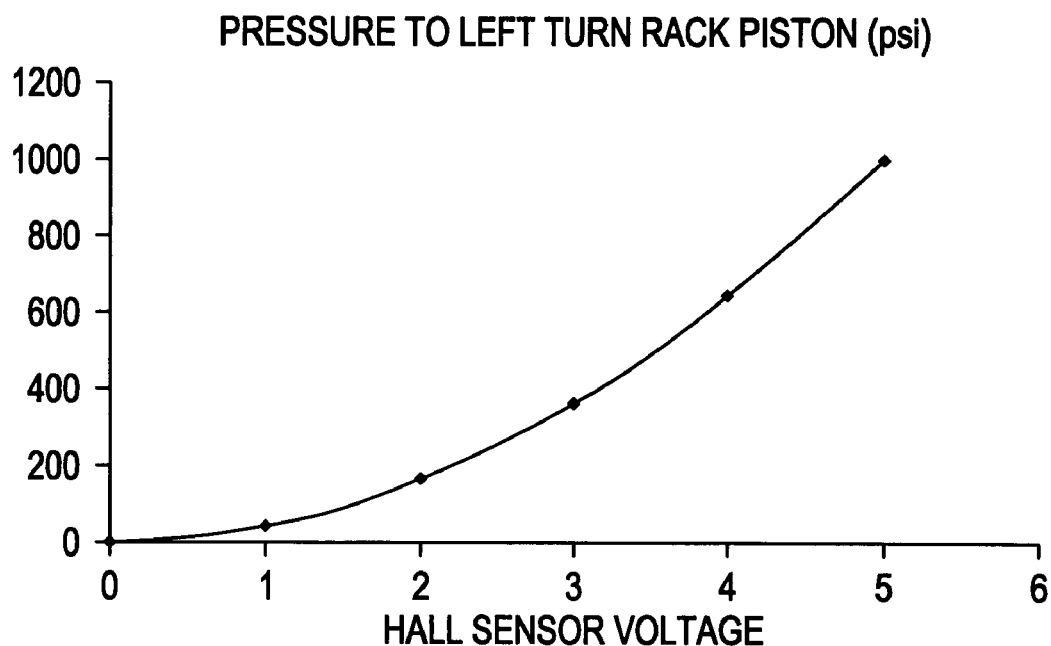
FIG. 15 is a graph plotting a typical pressure to a turn-side of the hydraulic piston in psi (pounds per square inch) versus Hall sensor voltage output.

At a certain level of twist, a typical torque being 10 Newton meters, the steering wheel tube 86 solidly connects to the pinion shaft 88, and the rack gear 92 can be moved by manual steering which provides a backup to the power steering assist. This amount of twist, typically six degrees, is well below the elastic limit (yield strength) of the steering torsion bar 24. As the steering torsion bar 24 twists, the sweep magnet 12 creates a varying magnetic field in the area of the Hall Sensors 14 and 16 (see FIG. 13 which plots the relative magnetic flux density at (and the relative voltage output of) a Hall sensor versus the relative separation distance between the Hall sensor and the sweep magnet. This magnetic field results in a variable voltage (see FIG. 14 which plots the first and second voltage outputs 48 and 50 of the first and second Hall sensors 14 and 16 versus the sensor-to-sweep-magnet displacement in degrees). The voltage output 48 or 50 of a Hall sensor 14 or 16 is related to the pressure to a turn side 58 or 60 at the hydraulic piston 56 as shown in FIG. 15.

This variable voltage 48 and 50 is then processed in the controller 34 and is subsequently used to send commands to the first and second pressure-control valves 44 and 46 that control pressure to each side of the hydraulic piston 56, thus providing hydraulic assist in steering to the driver. The system uses the relative rotary motion of the pinion shaft 88 to the motion of the vehicle steering wheel 26 as a signal to actuate power steering assist in either direction based on the magnitude and direction of the relative motion.

Figure 6:
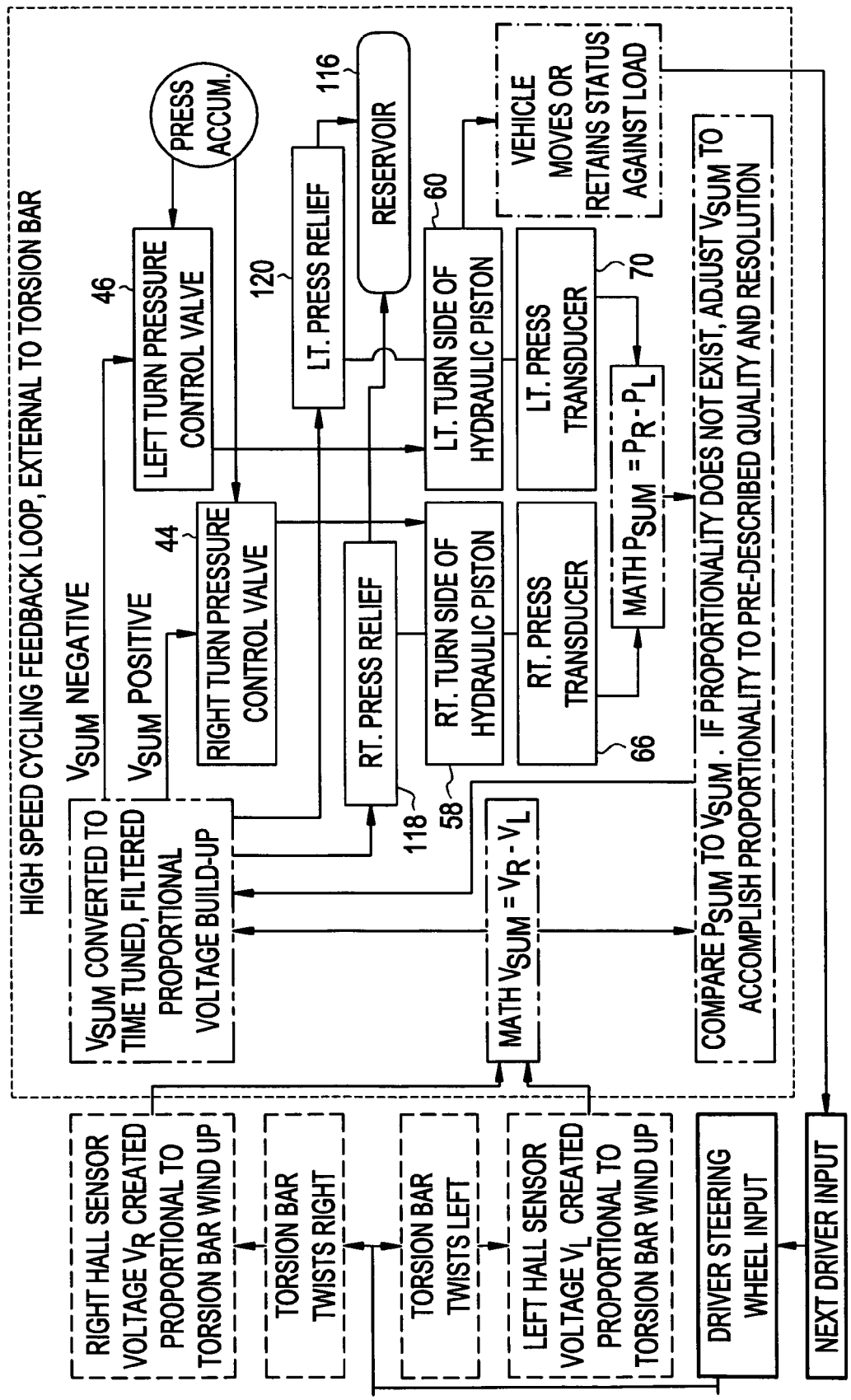
FIG. 6 is an explanatory block diagram of the control logic for operating the power steering system of FIG. 1.
Figure 7:
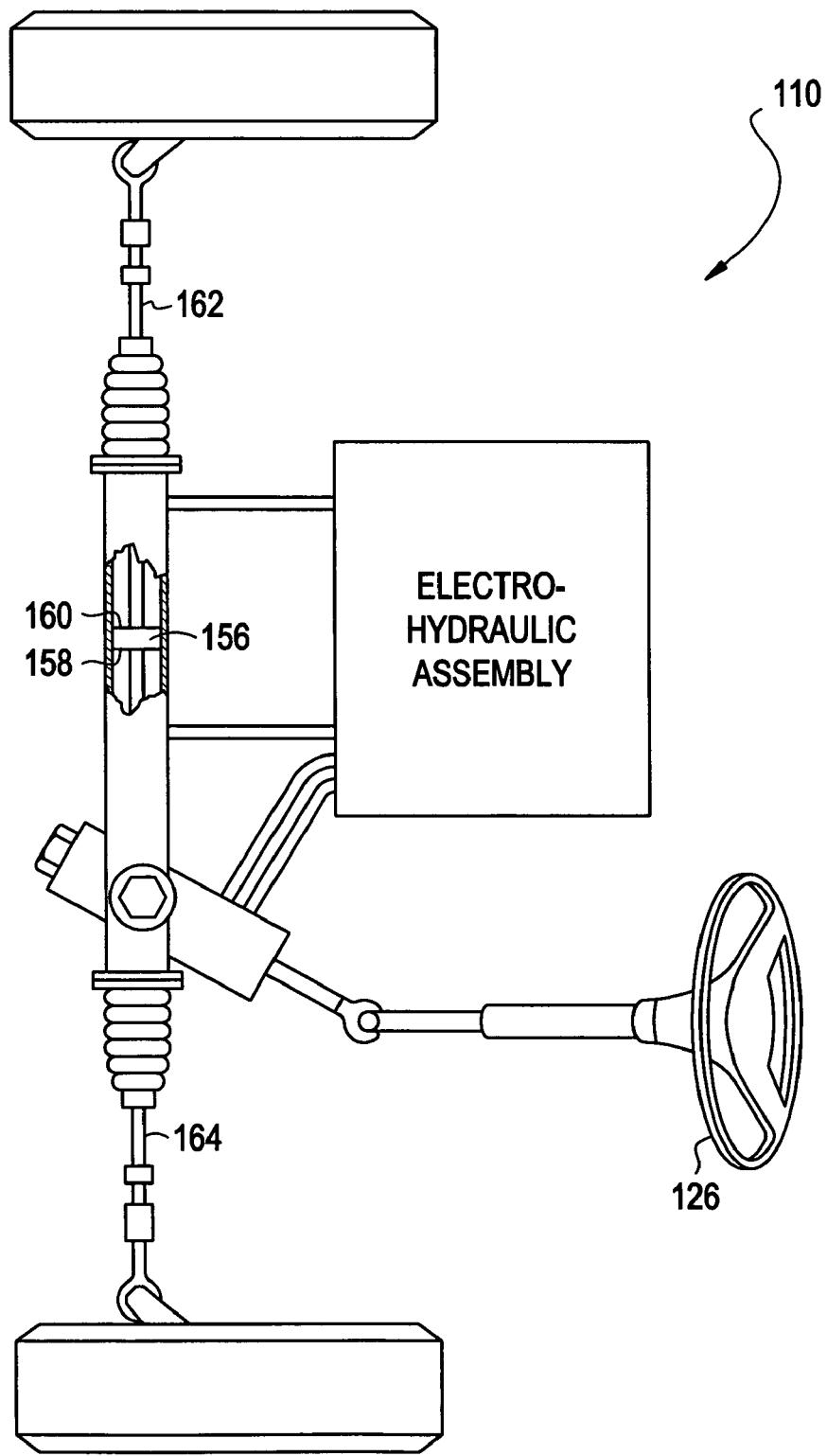
FIG. 7 is a schematic diagram of a second embodiment of a vehicle power steering system of the invention.
Figure 8:
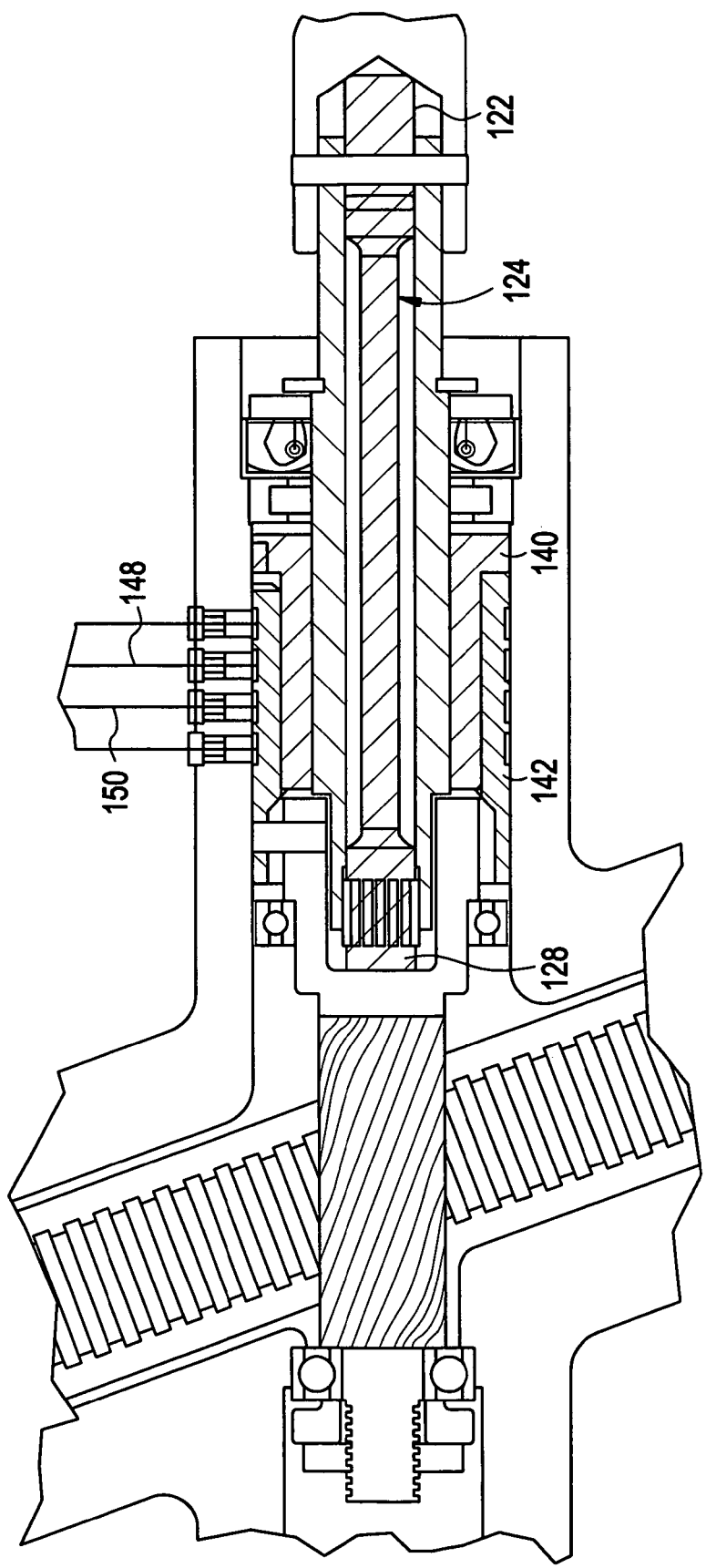
FIG. 8 is a cutaway view of a portion of the power steering system of FIG. 7 including the steering torsion bar.

FIG. 6 describes the use of a high frequency feedback loop to establish a pressure level consistent with the steering wheel torque, as can be understood by the artisan. In this enablement, the pressure level is converged on, external to the driver/vehicle feedback loop. An advantage of this enablement is that it avoids a high frequency cycling event that can be felt in the steering wheel.

In one example of FIG. 6, as the steering torsion bar 24 twists to the right due to torque being applied by the driver on the vehicle steering wheel 26 to the right, either the pinion gear 90 moves the rack gear 92 and relieves the torque (manual steering) or, if more torque is applied, the wind up of the steering torsion bar 24 with respect to the steering wheel shaft 100 will actuate the first Hall Sensor 14 which will send a first output voltage 48 to the microprocessor. This signal is amplified in the 12 volt power steering system controller 34 to a stronger current and becomes the first control voltage 52 which actuates the first pressure-control valve 44 (denominated "right turn pressure control valve") in FIG. 6. This NC (Normally Closed) valve allows high pressure fluid from the high pressure accumulator to flow to the right-turn side 58 of the hydraulic piston 56, until the first pressure output (voltage) 68 of the first pressure transducer 66 indicates pressure is achieved. The pressure sensors 66 and 70 in each pressure line 96 and 98 going to the right-turn side 58 and the left-turn side 60 of the hydraulic piston 56 provide feedback so that the correct valve voltage and therefore pressure is achieved at each side of the hydraulic piston as a function of the steering torsion bar windup. This moves the hydraulic piston 56 to the right, which moves the rack shaft 93 right, which will steer the vehicle to the right. Whenever pressure is applied to one side of the hydraulic piston 56, the opposite side is fully exhausted to the reservoir 116 by the first and second exhaust valves 118 and 120. For a left turn, just the opposite sequence occurs.

Figure 12:
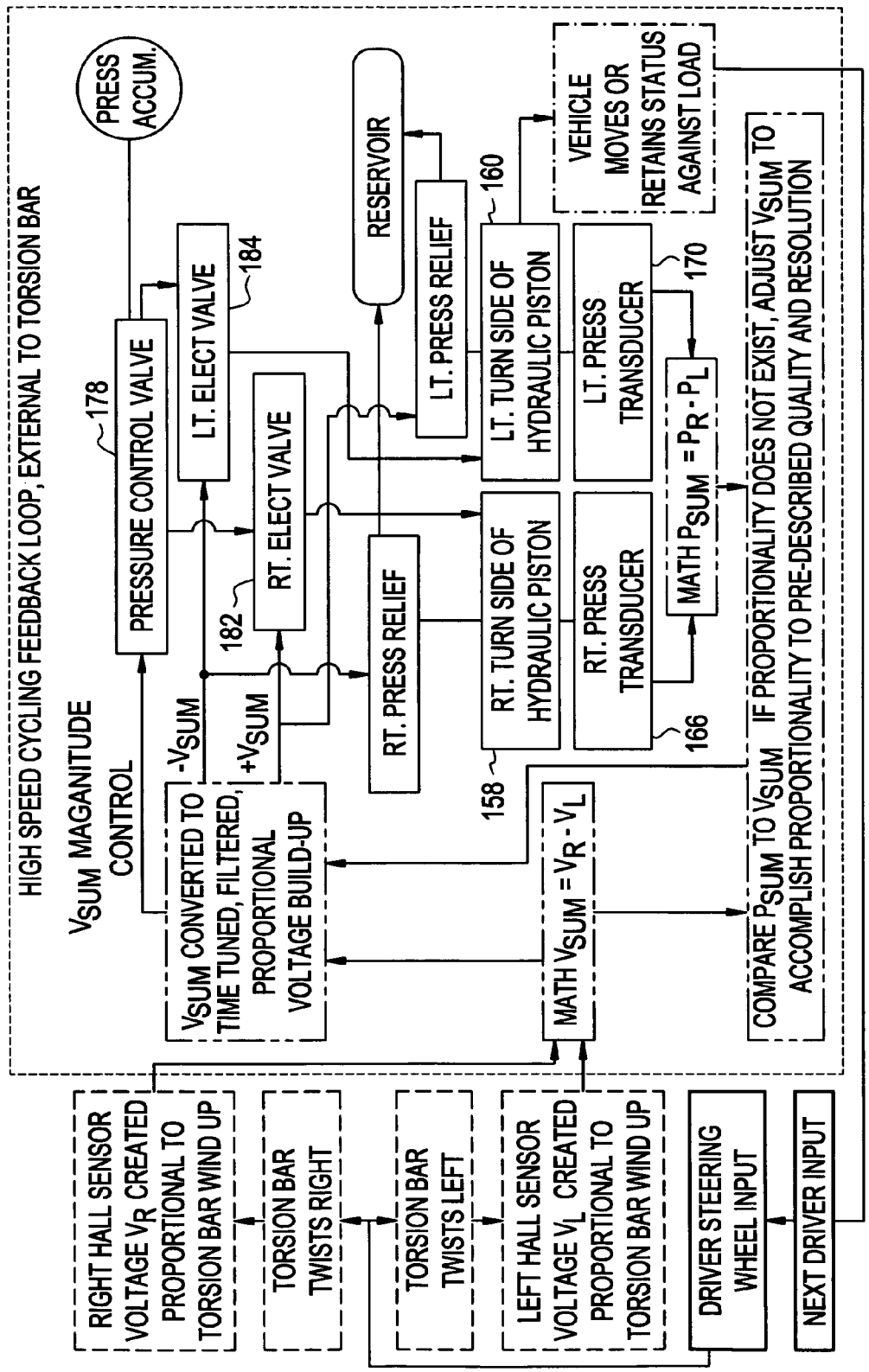
FIG. 12 is an explanatory block diagram of the control logic for operating the power steering system of FIG. 7.

It is noted that FIG. 12 describes the use of a high frequency feedback loop which uses a single pressure-control valve 178 to establish a pressure level consistent with the steering wheel torque, as can be understood by the artisan. The single pressure-control valve 178 and right and left electric valves 182 and 184 are used to raise the pressure to the desired level of either the right-turn side or the left-turn side of the hydraulic piston 156 and to just expose the correct right or left turn side of the hydraulic piston to either this pressure or exhaust, depending on the steering wheel input.

Referring once more to the drawings, FIGS. 16-22 illustrate a third embodiment of the present invention. A first expression of the embodiment of FIGS. 16-22 is for a vehicle power steering system 210 which includes a twistable steering torsion bar 212, a magnet 214, at least one Hall sensor 216 and 218, and at least one hydraulic-power-steering-system valve 220. The steering torsion bar 212 has a longitudinal axis 222 and has a first end 224 fixedly connected to a vehicle steering wheel 226. The magnet 214 is movable in a first (along arrow 228) and an opposite second (along arrow 230) longitudinal direction with respect to the steering torsion bar 212 and is constrained to move in the first longitudinal direction 228 when the steering wheel 226 is turned to the right by a driver and is constrained to move in the second longitudinal direction 230 when the steering wheel 226 is turned to the left by the driver. The at-least-one Hall sensor 216 and 218 has an output 232 and 234 and is disposed proximate the magnet 214 wherein the magnet 214 moves in the first longitudinal direction 228 with respect to the at-least-one Hall sensor 216 and 218 when the steering wheel 226 is turned to the right by the driver and moves in the second longitudinal direction 230 with respect to the at-least-one Hall sensor 216 and 218 when the steering wheel 226 is turned to the left by the driver. The at-least-one hydraulic-power-steering-system valve 220 is operatively connected to the output 232 and 234.

It is noted that the output 232 and 234 of the at-least-one Hall sensor 216 and 218 is a function of steering wheel torque when the vehicle steering wheel 226 is turned by the driver.

In one arrangement of the first expression of the embodiment of FIGS. 16-22, the magnet 214 is a ring magnet 236 substantially coaxially aligned with the longitudinal axis 222 and radially outwardly spaced apart from the steering torsion bar 212. In one variation, the at-least-one Hall sensor 216 and 218 includes first and second Hall sensors 216 and 218 substantially diametrically aligned about the ring magnet 236. In one modification, the output 232 and 234 includes a first output 232 of the first Hall sensor 216 and a second output 234 of the second Hall sensor 218, and the at-least-one hydraulic-power-steering-system valve 220 is operatively connected to at least one of the first and second outputs 232 and 234 through a controller 238. In one employment, the at-least-one hydraulic-power-steering-system valve 220 includes an electrically actuated valve which, in one example, is a pressure control valve.

A second expression of the embodiment of FIGS. 16-22 is for a vehicle power steering system 210 which is identical to the first expression of the embodiment of FIGS. 16-22 described in the second previous paragraph with an added limitation that the steering torsion bar 212 has a second end 240 fixedly connected to a pinon shaft 242 of a rack and pinion steering gear mechanism 244. It is noted that the arrangements, variations, etc. of the first expression of the embodiment of FIGS. 16-22 are equally applicable to the second expression of the embodiment of FIGS. 16-22.

A third expression of the embodiment of FIGS. 16-22 is for a vehicle power steering system 210 which includes a twistable steering torsion bar 212, a ring-magnet support cylinder 246, a ring-magnet assembly 248, a ball-and-ramp assembly 250, a spring 252, at least one Hall sensor 216 and 218, and at least one hydraulic-power-steering-system valve 220. The steering torsion bar 212 has a longitudinal axis 222, a first end 224, and a second end 240, wherein the first end 224 is fixedly connected to a vehicle steering wheel 226. The ring-magnet support cylinder 246 is substantially coaxially aligned with the longitudinal axis 222 and is fixedly connected to one of the first and second ends 224 and 240 of the steering torsion bar 212. The ring-magnet assembly 248 includes a ring magnet 236, circumferentially surrounds the ring-magnet support cylinder 246, and is movable in a first and an opposite second longitudinal direction 228 and 230 with respect to the ring-magnet support cylinder 246. The ball-and-ramp assembly 250 includes a plurality of balls 254 and an annular ramp subassembly 256. The ramp subassembly 256 is substantially coaxially aligned with the longitudinal axis 222, is fixedly connected to the other of the first and second ends 224 and 240 of the steering torsion bar 212, and includes a corresponding plurality of ball ramps 258 disposed proximate the ring magnet assembly 248. Each ball ramp 258 is adapted to move a contacting ball 254 in the first longitudinal direction 228 when the steering wheel 226 is turned to the right by a driver and to move a contacting ball 254 in the second longitudinal direction 230 when the steering wheel 226 is turned to the left by a driver. The spring 252 longitudinally biases the ring-magnet assembly 248 to contact the plurality of balls 254 and the plurality of balls 254 to contact the corresponding ball ramps 258. The at-least-one Hall sensor 216 and 218 has an output 232 and 234 and is disposed proximate the ring magnet 236 wherein the ring magnet 236 moves in the first longitudinal direction 228 with respect to the at-least-one Hall sensor 216 and 218 when the steering wheel 226 is turned to the right by the driver and moves in the second longitudinal direction 230 with respect to the at-least-one Hall sensor 216 and 218 when the steering wheel 226 is turned to the left by the driver. The at-least-one hydraulic-power-steering-system valve 220 is operatively connected to the output 232 and 234.

In one arrangement of the third expression of the embodiment of FIGS. 16-22, the ring-magnet support cylinder 246 is fixedly connected to the first end 224 of the steering torsion bar 212, and the ramp subassembly 256 is fixedly connected to the second end 240 of the steering torsion bar 212. In the same or a different arrangement, the plurality is three. In the same or a different arrangement, each ball ramp 258 is rotationally aligned about a radius to the ball ramp 258 at a counter-clockwise angle of substantially forty-five degrees away from facing along the second longitudinal direction 230, as can be seen from FIG. 22. Other values for the angle are left to those skilled in the art.

In one implementation of the third expression of the embodiment of FIGS. 16-22, the spring 252 preloads the ring-magnet assembly 248 to substantially longitudinally align the ring magnet 236 with the at-least-one Hall sensor 216 and 218 when no torque is applied to the steering torsion bar 212. In one variation, when no torque is applied to the steering torsion bar 212, each ball 254 is positioned proximate the center of the corresponding ball ramp 258. It is noted that the variations, modifications, etc. of the first expression of the embodiment of FIGS. 16-22 are equally applicable to the third expression of the embodiment of FIGS. 16-22.

Several benefits and advantages are derived from one or more of the expressions of the third embodiment of the invention. In one example, having at least one Hall sensor to sense steering wheel torque enables the at-least-one hydraulic-power-steering system valve to be electrically actuated and enables the power steering system to operate on demand which saves on fuel consumption, as can be appreciated by those skilled in the art. In the same or a different example, having valve control based on the output of a Hall sensor which depends on steering wheel torque and which is adjusted for measured fluid pressure, allows feedback control that converges on a desired pressure avoiding high frequency cycling events felt in the steering wheel of unsuccessful electric-controlled power steering systems which include a driver-to-vehicle feedback loop, as can be appreciated by the artisan. In the same or a different example, having the at-least-one Hall sensor be actuated by a magnet which moves longitudinally in response to steering torsion bar twist avoids the use of contact electric rings and contact brushes.

Figure 16:
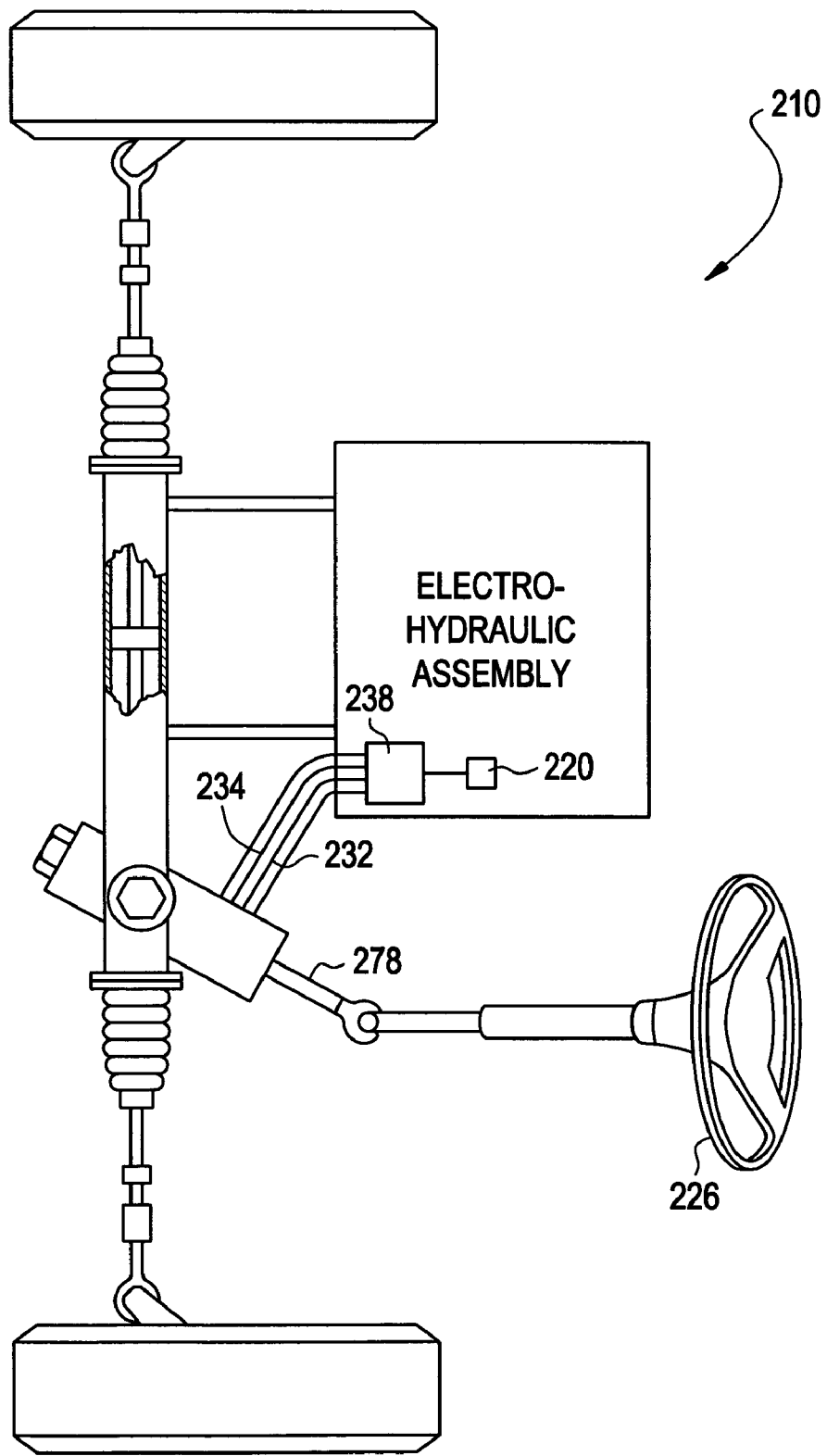
FIG. 16 is a schematic diagram of a third embodiment of a vehicle power steering system of the invention.
Figure 17:
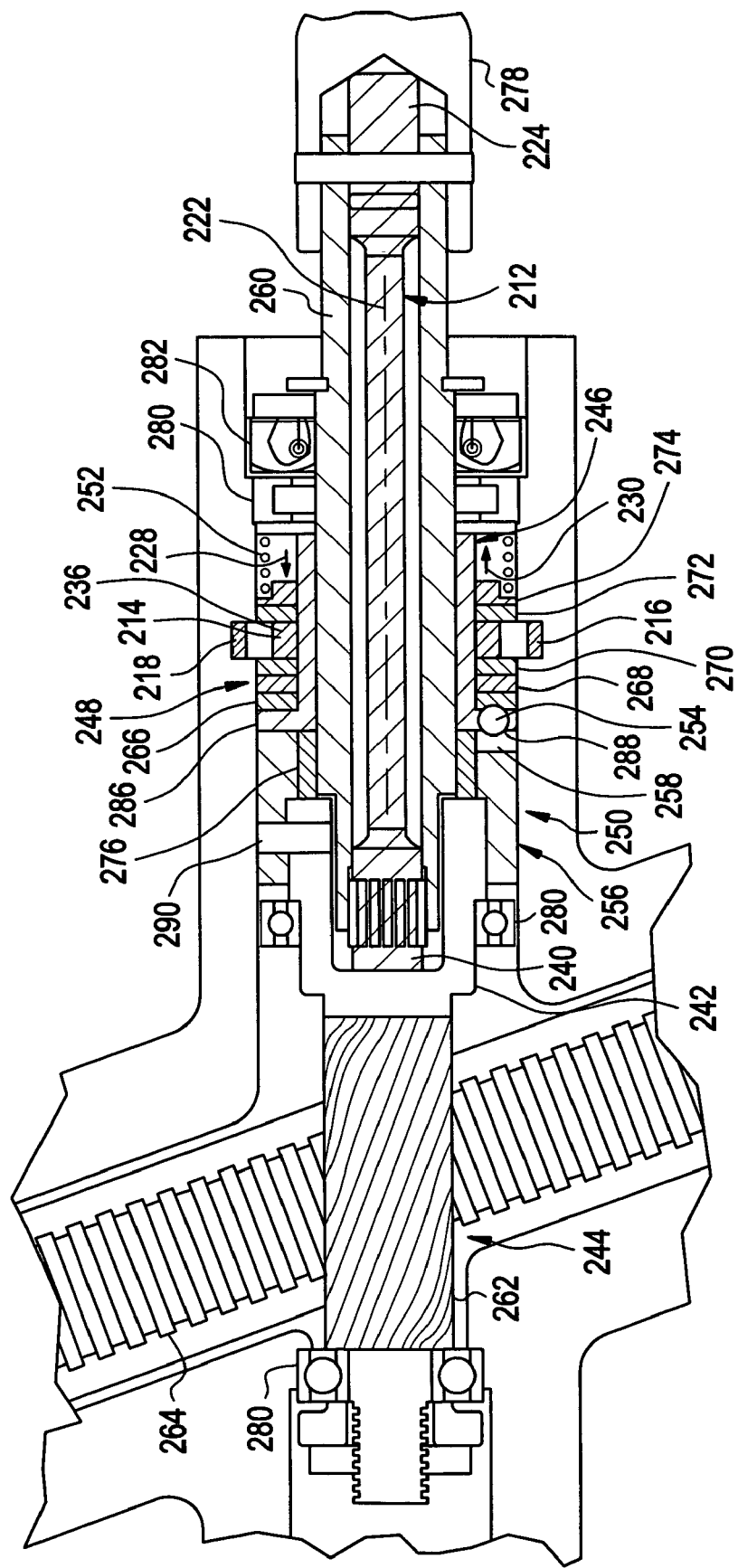
FIG. 17 is a cutaway view of a portion of the power steering system of FIG. 16 including the steering torsion bar and showing one ball.
Figure 19:
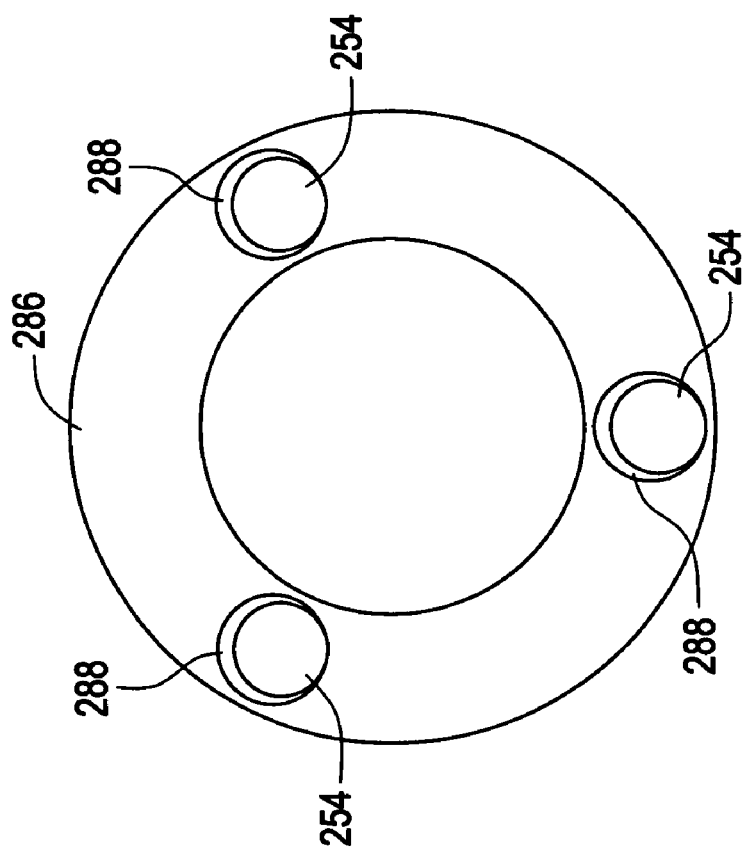
FIG. 19 is an end elevational view of the ring-magnet support cylinder taken along lines 19-19 of FIG. 18 showing three balls engaged in a corresponding orifice of the flange of the ring-magnet support cylinder.
Figure 18:
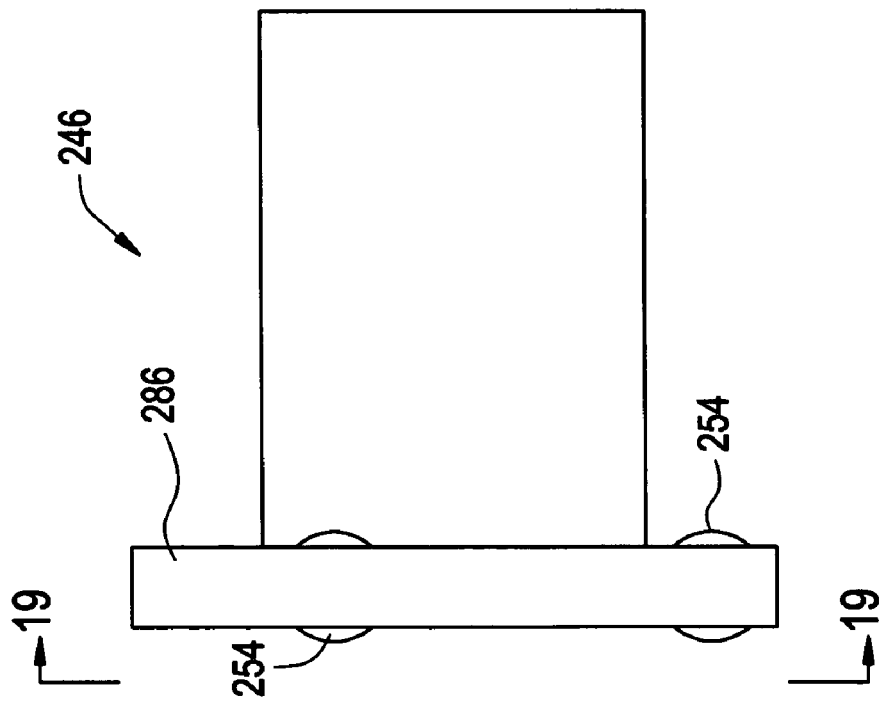
FIG. 18 is a side elevational exterior view of the ring-magnet support cylinder of FIG. 17 shown engaged by two balls.
Figure 22:
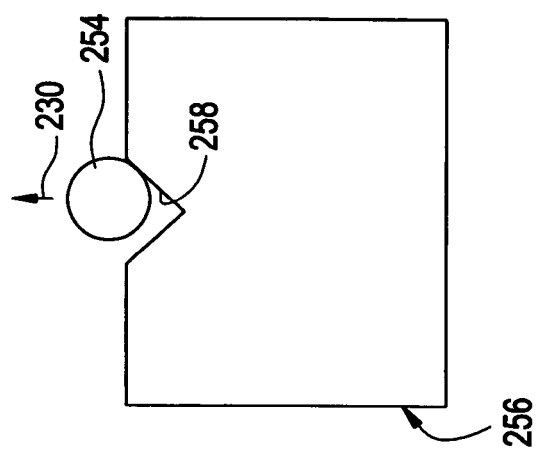
FIG. 22 is a bottom planar view of the ramp subassembly taken along lines 22-22 of FIG. 21 with the addition of a ball shown engaging the corresponding ball ramp.
Figure 21:
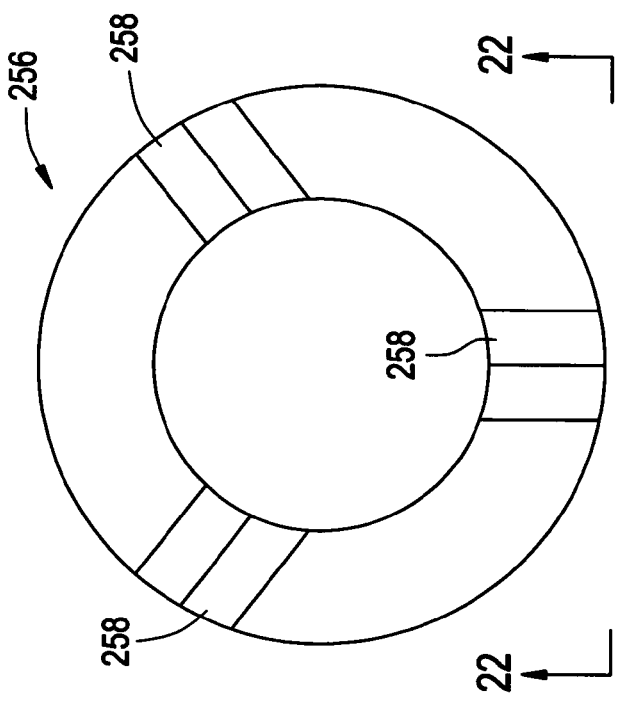
FIG. 21 is an end elevational view of the ramp subassembly taken along lines 21-21 of FIG. 20.
Figure 20:
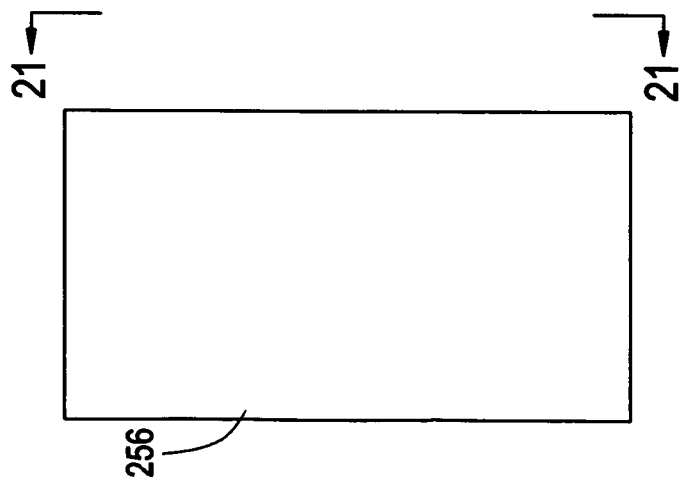
FIG. 20 is a side elevational exterior view of the ramp subassembly of FIG. 17.

The following paragraphs (including references to figures) present a detailed description of one enablement of the third expression of the embodiment of FIGS. 16-22. As shown in FIGS. 16-17, the ring-magnet support cylinder 246 is attached to the steering wheel tube 260 which is attached to the first end 224 of the steering torsion bar 212. The ramp subassembly 256 is attached to the pinion shaft 242 which is attached to the second end 240 of the steering torsion bar 212. The pinion shaft 242 is attached to the pinion gear 262 which engages the rack gear 264.

The ring-magnet assembly 248 includes in contacting relationship (and from left to right as seen in FIG. 17): a first steel ring 266 contacting the balls 254; a bronze washer 268; a second steel ring 270; the ring magnet 236; a third steel ring 272; and a first nylon ring 274 contacting the spring 252. The spring 252 exerts a light pressure (i.e., just enough to maintain the preload). The ring-magnet support cylinder 246 consists essentially of bronze, and a second nylon ring 276 is positioned radially between the steering wheel tube 260 and the ramp subassembly 256 and longitudinally between the bronze (nonmagnetic) ring-magnet support cylinder 246 and the pinion shaft 242. Other suitable materials are left to those skilled in the art.

It is noted that the steering wheel shaft 278 is attached at one end to the vehicle steering wheel 226 and at the other end to both the first end 224 of the steering torsion bar 212 and the steering wheel tube 260. FIG. 17 also shows sealed bearings 280 and seal 282. FIG. 17 further shows the ring-magnet support cylinder 246 having a flange 286 which includes a plurality of orifices 288 each engaging a corresponding ball 254 to constrain ball motion to along the first and second longitudinal directions 228 and 230, as can be appreciated by those skilled in the art. The ramp subassembly 256 is attached to the pinion shaft 242 by a pin 290. The first and second outputs 232 and 234 of the corresponding first and second Hall sensors 216 and 218 are shown in FIG. 17 and have been omitted from FIG. 16 for clarity. The only other numbered components of FIG. 16 are the steering wheel shaft 278 and the steering wheel 226. In one example, the unnumbered components of FIG. 16 are otherwise identical to the previously described numbered components of FIG. 1 with FIG. 17 replacing FIG. 2, as can be appreciated by those skilled in the art.

Figure 3:
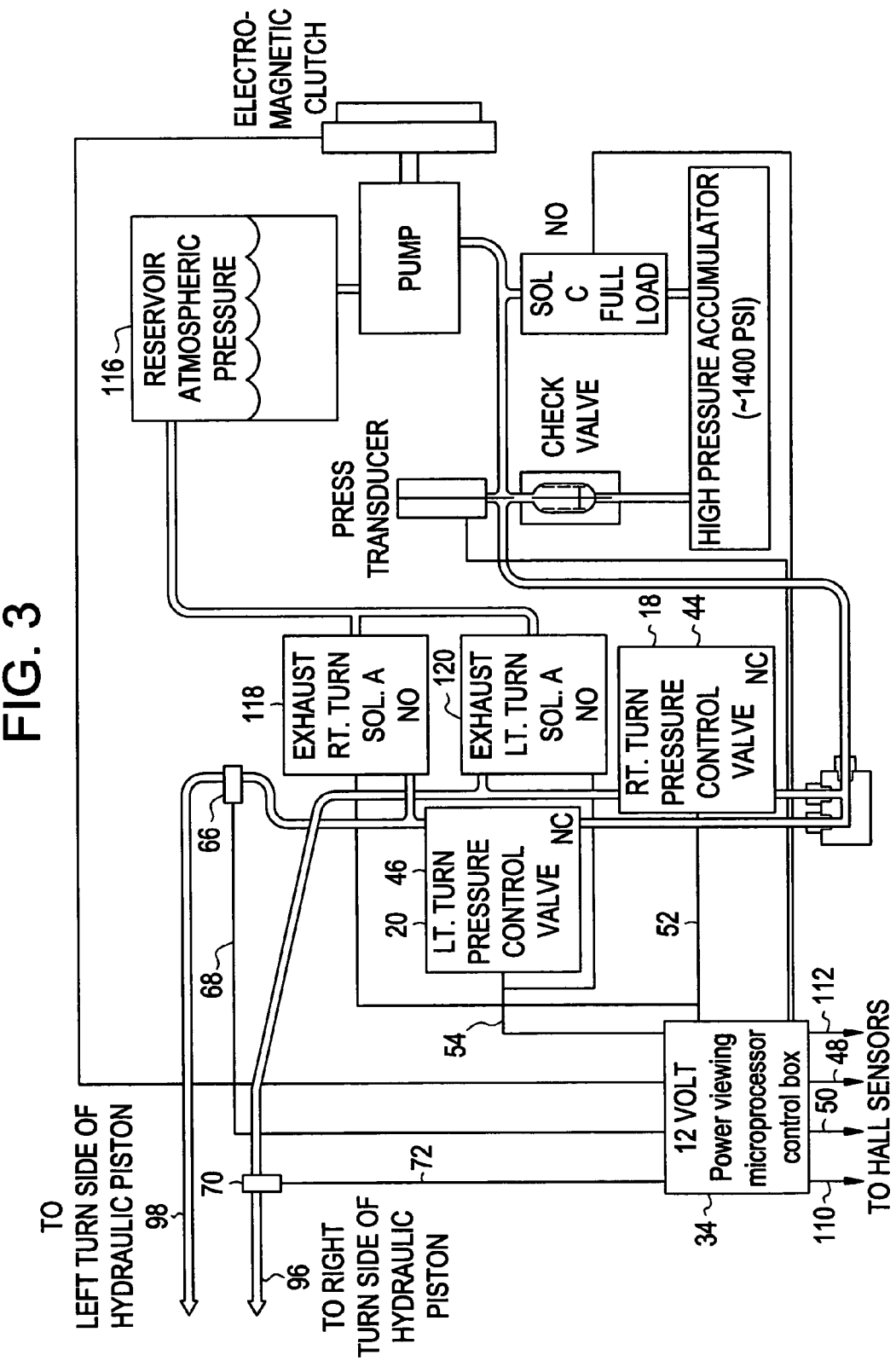
FIG. 3 is a detailed view of the electro-hydraulic assembly of the power steering system of FIG. 1.
Figure 4:
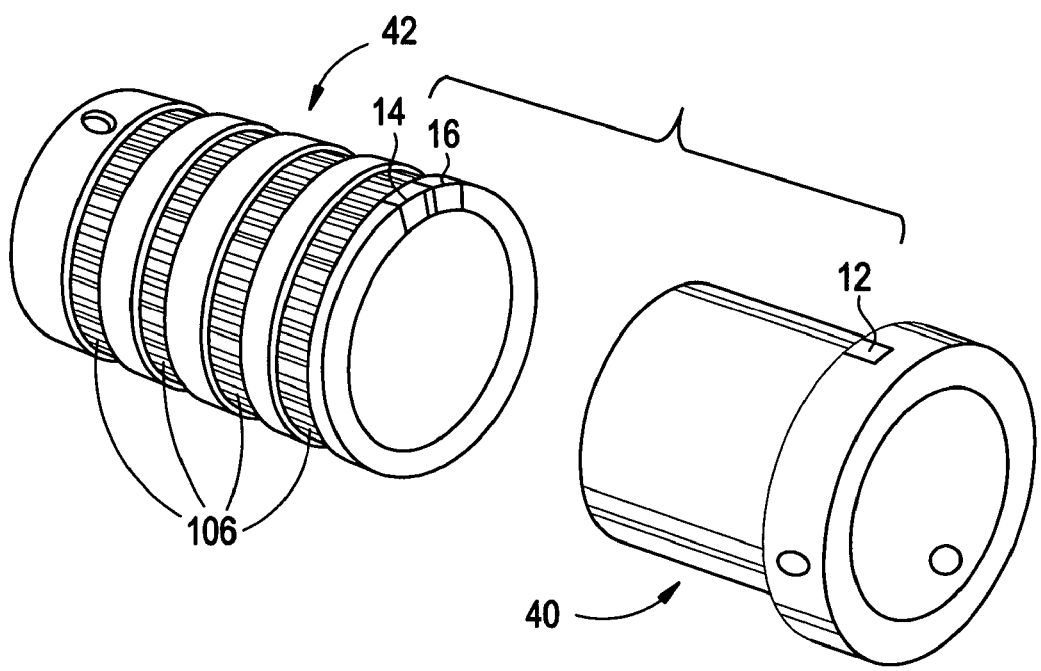
FIG. 4 is a perspective view of the first cylinder, including the sweep magnet, and the second cylinder, including the first and second Hall sensors, of the power steering system of FIG. 2, wherein the cylinders are shown separated prior to assembly.
Figure 5:
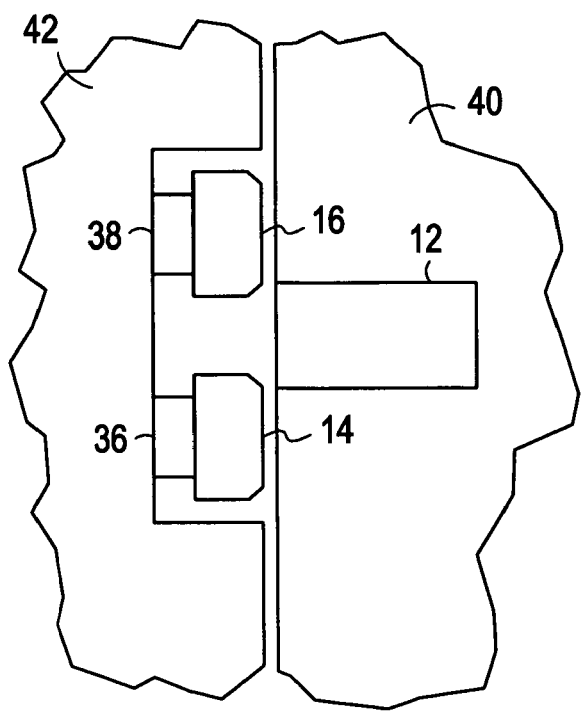
FIG. 5 is a top plan schematic view of the sweep magnet and Hall sensor portion of the power steering system of FIG. 2 also showing the biasing magnets.
Figure 9:
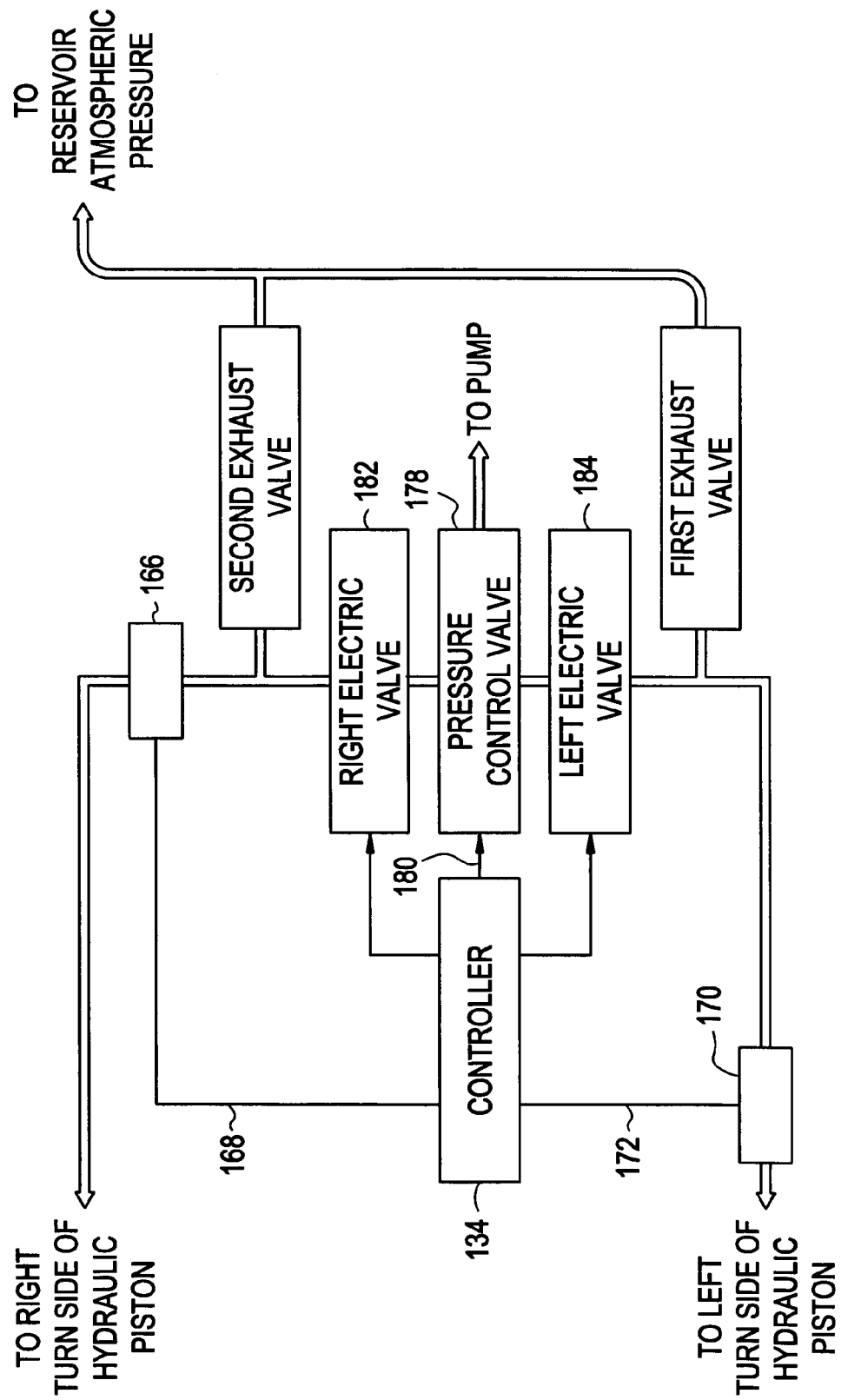
FIG. 9 is a detailed view of a portion of the electro-hydraulic assembly of the power steering system of FIG. 7.
Figure 10:
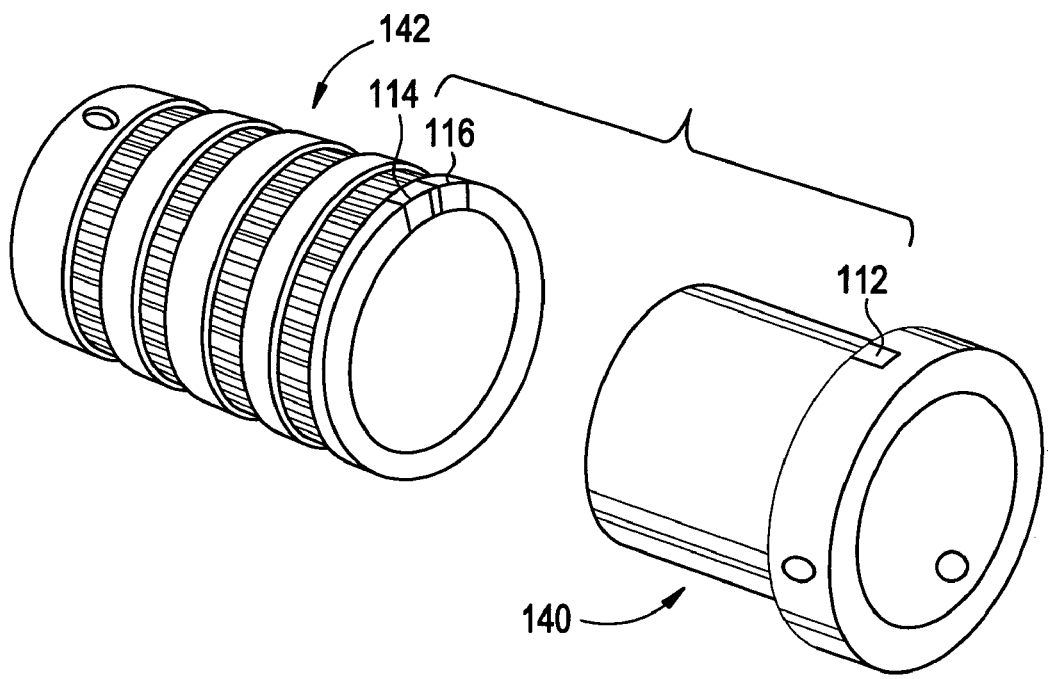
FIG. 10 is a perspective view of the first cylinder, including the sweep magnet, and the second cylinder, including the first and second Hall sensors, of the power steering system of FIG. 8, wherein the cylinders are shown separated prior to assembly.
Figure 11:
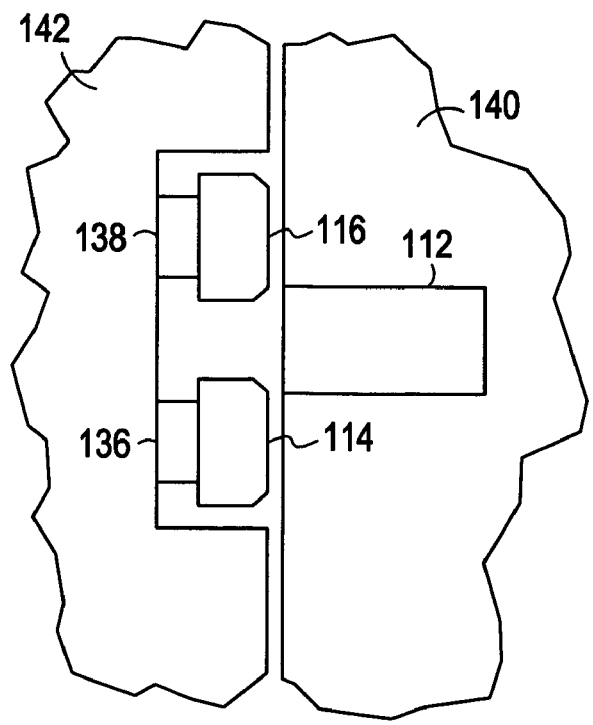
FIG. 11 is a top plan schematic view of the sweep magnet and Hall sensor portion of the power steering system of FIG. 8 also showing the biasing magnets.

In one application, FIGS. 3 (electro-hydraulic assembly) and 6 (control logic) of the previously-discussed first embodiment of a vehicle power steering system and FIGS. 9 (electro-hydraulic assembly) and 12 (control logic) of the previously-discussed second embodiment of a vehicle power steering system apply to the third expression of the embodiment of FIGS. 16-22. In one example, the second Hall sensor 218 is "flipped over" so that the face that faced inwards on the first Hall sensor 216 would face outward on the second Hall sensor 218. This has the effect of reversing the North/South sense of the second Hall sensor 218. The first and second Hall sensors 216 and 218 are disposed to output +2.5 volts when there is no steering torsion bar twist. When the ring magnet 236 longitudinally moves along the first longitudinal direction 216 with a right turn of the steering wheel 226, the first output 232 of the first Hall sensor 216 increases in voltage from +2.5 volts and the second output 234 of the second Hall sensor 218 decreases in voltage from +2.5 volts. By taking the difference in the first and second outputs (i.e., the first output minus the second output), a positive difference indicates a right turn valve is to be activated and a negative difference indicates a left turn valve is to be activated. Taking the difference doubles the torque sensitivity and averages out errors due to runout or swash in the ring-magnet assembly 248, as can be appreciated by those skilled in the art. In one option, the sum of the first and second outputs is also calculated and the power steering system is disabled if the sum deviates much from +5 volts. In a different example, only one Hall sensor is used, wherein the one Hall sensor is disposed to output +2.5 volts when there is no steering torsion bar twist, wherein an output above +2.5 volts indicates a right turn valve is to be activated, and wherein an output below +2.5 volts indicates a left turn valve is to be activated. Other examples are left to the artisan.

The foregoing description of several expressions of embodiments of the invention has been presented for purposes of illustration. It is not intended to be exhaustive or to limit the invention to the precise forms and steps disclosed, and obviously many modifications and variations are possible in light of the above teaching. It is intended that the scope of the invention be defined by the claims appended hereto.

The invention claimed is:

1. A vehicle power steering system comprising:
  a) a twistable steering torsion bar having a longitudinal axis and having a first end fixedly connected to a vehicle steering wheel;
  b) a magnet movable in a first and an opposite second longitudinal direction with respect to the steering torsion bar;
  c) a ball-and-ramp assembly operatively engaged with the steering wheel and operable to move the magnet in the first longitudinal direction when the steering wheel is turned to the right and in the second longitudinal direction when the steering wheel is turned to the left;
  d) at least one Hall sensor having an output and disposed proximate the magnet wherein the magnet moves in the first longitudinal direction with respect to the at-least-one Hall sensor when the steering wheel is turned to the right and moves in the second longitudinal direction with respect to the at-least-one Hall sensor when the steering wheel is turned to the left;
  e) at least one hydraulic-power-steering-system valve operatively connected to the output.

2. The vehicle power steering system of claim 1, wherein the magnet is a ring magnet substantially coaxially aligned with the longitudinal axis and radially outwardly spaced apart from the steering torsion bar.

3. The vehicle power steering system of claim 2, wherein the at-least-one Hall sensor includes first and second Hall sensors substantially diametrically aligned about the ring magnet.

4. The vehicle power steering system of claim 3, wherein the output includes a first output of the first Hall sensor and a second output of the second Hall sensor, and wherein the at-least-one hydraulic-power-steering-system valve is operatively connected to at least one of the first and second outputs through a controller.

5. The vehicle power steering system of claim 4, wherein the at-least-one hydraulic-power-steering-system valve includes an electrically actuated valve.

6. The vehicle power steering system of claim 5, wherein the electrically actuated valve is a pressure control valve.

7. A vehicle power steering system comprising:
  a) a twistable steering torsion bar having a longitudinal axis, a first end, and a second end, wherein the first end is fixedly connected to a vehicle steering wheel;
  b) a ring-magnet support cylinder substantially coaxially aligned with the longitudinal axis and fixedly connected to one of the first and second ends of the steering torsion bar;
  c) a ring-magnet assembly including a ring magnet, circumferentially surrounding the ring-magnet support cylinder, and movable in a first and an opposite second longitudinal direction with respect to the ring-magnet support cylinder;
  d) a ball-and-ramp assembly including a plurality of balls and an annular ramp subassembly, wherein the ramp subassembly is substantially coaxially aligned with the longitudinal axis, is fixedly connected to the other of the first and second ends of the steering torsion bar, and includes a corresponding plurality of ball ramps disposed proximate the ring magnet assembly, wherein each ball ramp is adapted to move a contacting ball in the first longitudinal direction when the steering wheel is turned to the right by a driver and to move a contacting ball in the second longitudinal direction when the steering wheel is turned to the left by a driver;
  e) a spring longitudinally biasing the ring-magnet assembly to contact the plurality of balls and the plurality of balls to contact the corresponding ball ramps;
  f) at least one Hall sensor having an output and disposed proximate the ring magnet wherein the ring magnet moves in the first longitudinal direction with respect to the at-least-one Hall sensor when the steering wheel is turned to the right by the driver and moves in the second longitudinal direction with respect to the at-least-one Hall sensor when the steering wheel is turned to the left by the driver; and
  g) at least one hydraulic-power-steering-system valve operatively connected to the output.

8. The vehicle power steering system of claim 7, wherein the ring-magnet support cylinder is fixedly connected to the first end of the steering torsion bar, and wherein the ramp subassembly is fixedly connected to the second end of the steering torsion bar.

9. The vehicle power steering system of claim 7, wherein the plurality is three.

10. The vehicle power steering system of claim 7, wherein each ball ramp is rotationally aligned about a radius to the ball ramp at a counter-clockwise angle of substantially forty-five degrees away from facing along the second longitudinal direction.

11. The vehicle power steering system of claim 7, wherein the spring preloads the ring-magnet assembly to substantially radially align the ring magnet with the at-least-one Hall sensor when no torque is applied to the steering torsion bar.

12. The vehicle power steering system of claim 7, wherein the at-least-one Hall sensor includes first and second Hall sensors substantially diametrically aligned about the ring magnet.

13. The vehicle power steering system of claim 12, wherein the output includes a first output of the first Hall sensor and a second output of the second Hall sensor, and wherein the at-least-one hydraulic-power-steering-system valve is operatively connected to at least one of the first and second outputs through a controller.

14. The vehicle power steering system of claim 13, wherein the at least-one hydraulic-power-steering-system valve includes an electrically actuated valve.

15. The vehicle power steering system of claim 14, wherein the electrically actuated valve is a pressure control valve.

16. The vehicle power steering system of claim 15, wherein the plurality is three.

17. The vehicle power steering system of claim 16, wherein each ball ramp is rotationally aligned about a radius to the ball ramp at a counter-clockwise angle of substantially forty-five degrees away from facing along the second longitudinal direction.

18. The vehicle power steering system of claim 17, wherein the spring preloads the ring-magnet assembly to substantially longitudinally align the ring magnet with the at-least-one Hall sensor when no torque is applied to the steering torsion bar.

19. A vehicle power steering system comprising:
  a) a twistable steering torsion bar having a longitudinal axis, a first end, and a second end, wherein the first end is fixedly connected to a vehicle steering wheel, and wherein the second end is fixedly connected to a pinion shaft of a rack and pinion steering gear mechanism;
  b) a magnet movable in a first and an opposite second longitudinal direction with respect to the steering torsion bar;
  c) a ball-and-ramp assembly connected to the pinion shaft and operable to move the magnet in the first longitudinal direction when the steering wheel is turned to the right and in the second longitudinal direction when the steering wheel is turned to the left;
  d) at least one Hall sensor having an output and disposed proximate the magnet wherein the magnet moves in the first longitudinal direction with respect to the at-least-one Hall sensor when the steering wheel is turned to the right and moves in the second longitudinal direction with respect to the at-least-one Hall sensor when the steering wheel is turned to the left; and
  e) at least one hydraulic-power-steering-system valve operatively connected to the output.

20. The vehicle power steering system of claim 19, wherein the at least-one hydraulic-power-steering-system valve includes an electrically-actuated pressure control valve.

* * * * *